United States Patent Office 3,808,298
Patented Apr. 30, 1974

3,808,298
AMIDOTHIONOPHOSPHORIC ACID
PHENYL ESTERS
Gerhard Schrader, Wuppertal-Cronenberg, and Ingeborg Hammann, Cologne, Germany, assignors to Bayer Aktiengesellschaft, Leverkusen, Germany
No Drawing. Filed Aug. 12, 1971, Ser. No. 171,382
Claims priority, application Germany, Aug. 17, 1970, P 20 40 651.3
Int. Cl. A01n 9/36; C07f 9/24
U.S. Cl. 260—941                  7 Claims

ABSTRACT OF THE DISCLOSURE

Amidothionophosphoric acid phenyl esters of the general formula

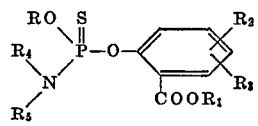
(I)

in which
R and $R_1$ each is a lower alkyl radical,
$R_2$ is a halogen, lower alkyl or lower alkylmercapto radical, and
$R_3$, $R_4$ and $R_5$ each is hydrogen or a lower alkyl radical,
which possess insecticidal and acaricidal properties.

---

The present invention relates to and has for its objects the provision of particular new amidothionophosphoric acid phenyl esters, i.e. N-alkylamido-O-alkyl-O-(2-carbalkoxy-substituted phenyl)-thionophosphoric acid ester amides, which possess insecticidal and acaricidal properties, active compositions in the form of mixtures of such compounds with solid and liquid dispersible carrier vehicles, and methods for producing such compounds and for using such compounds in a new way especially for combating pests, e.g. insects and acarids, with other and further objects becoming apparent from a study of the within specification and accompanying examples.

In German patent specification 814,152 there are described, among other things, N,N-dimethylamido-O-ethyl- and bis(N,N-dimethyl)-amidophosphoryl-salicylic acid ethyl esters (Compounds A and B, respectively) which are obtainable by reaction of alkali metal salts of the salicylic acid esters with the appropriate disubstituted phosphoric acid monochlorides. According to the information given in German patent specification 811,514, the aforesaid compounds are suitable for the active and passive control of sucking and biting insects and may therefore be used as pesticides.

Furthermore, O,O - dialkylthionophosphoryl-salicylic acid esters and their insecticidal and toxic activity are described in "R. L. Metcalf: Organic Insecticides," Interscience Publishers, New York, 1955.

The present invention provides, as new compounds, the amidothionophosphoric acid phenyl esters of the general formula

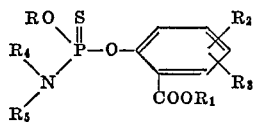
(I)

in which
R and $R_1$ each is a lower alkyl radical,
$R_2$ is a halogen, lower alkyl or lower alkylmercapto radical, and
$R_3$, $R_4$ and $R_5$ each is hydrogen or a lower alkyl radical, The present invention also provides a process for the preparation of a compound of the General Formula I, in which an O-alkyl-O-(2-carbalkoxy-phenyl)-thionophosphoric acid diester monohalide of the general formula

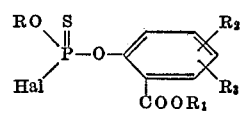
(II)

is reacted with a primary or secondary amine of the general formula

(III)

in which formulae
R, $R_1$, $R_2$, $R_3$, $R_4$ and $R_5$ have the meanings stated above, and
Hal is a halogen atom, preferably a chlorine or bromine atom.

It has been found that the compounds of the Formula I are distinguished by outstanding insecticidal and acaricidal properties, low toxicity to warm-blooded animals, as well as in some cases, extremely low phytotoxicity. They possess activity against biting, sucking and soil-inhabiting insects and in this respect are distinctly superior to the above-mentioned compounds of the prior art having analogous formulae. Therefore, the compounds of this invention represent a genuine enrichment of the art.

The course of the reaction is illustrated by the following equation:

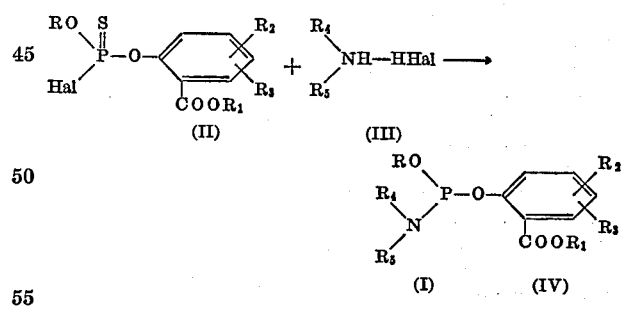

Preferably, R denotes an alkyl group with 1–4, especially 1–3 carbon atoms, namely methyl, ethyl or n- or iso-propyl; $R_1$ is an alkyl radical with 1–4, especially 2–4 carbon atoms, for example ethyl, n- or isopropyl or sec.- or tert.-butyl; $R_2$ is a chlorine atom or an alkyl or alkylmercapto radical with, in either case, 1–3 carbon atoms, namely methyl, ethyl, n- or isopropyl, methylmercapto, ethylmercapto or n- or isopropylmercapto; $R_3$ is a hydrogen atom or an alkyl group with 1–3 carbon atoms, namely, methyl, ethyl or n- or isopropyl; and $R_4$ is an alkyl radical with 1–3 carbon atoms, for example, methyl, ethyl or isopropyl; and $R_5$ is a hydrogen atom.

The O-alkyl-O-(2-carbalkoxyphenyl)-thionophosphoric acid diester monohalides of the Formula II, required as starting materials in the preparative process, have not hitherto been described in the literature. However, they are readily obtainable, even on an industrial scale, by reaction of O-alkyl-thionophosphoric acid ester dihalides with appropriate nuclear-substituted salicylic acid alkyl esters in the presence of solvents or diluents and of acid-acceptors. Good results have been obtained with the use of alkali metal hydroxides, carbonates and alcoholates as acid-acceptors, such as sodium or potassium hydroxide, methylate or ethylate, as well as tertiary bases, such as triethylamine, diethylaniline, dimethylbenzylamine or pyridine. Furthermore, it is possible, instead of working in the presence of acid-binding agents, to start with suitable salts of the nuclear-substituted salicylic acid esters concerned, preferably the alkali metal or ammonium salts thereof.

It has proved expedient to add the O-alkyl-thionophosphoric acid ester dihalide to a mixture of the salicylic acid ester, acid-acceptor and solvent (or of the salicylic acid ester salt and solvent), but the reverse manner of addition may be chosen.

The reaction of the O-alkyl-O-(2-carbalkoxyphenyl)-thionophosphoric acid diester monohalide of the Formula II with the amine of the Formula III is preferably effected in the presence of a solvent or diluent, for which purpose inert organic solvents may be used, especially aliphatic and aromatic optionally chlorinated hydrocarbons, such as methylene chloride, ethylene chloride, chloroform, carbon tetrachloride, mono-, di- and tri-chloroethylene, benzene, toluene, xylenes and chlorobenzene, and ethers, such as diethyl ether, dibutyl ether and dioxane.

The process of the present invention is preferably carried out with the use of an acid-binding agent. Although any of the acid-acceptors mentioned above may be used, it is expedient to employ an excess of the amine of the Formula III for this purpose.

The carrying out of the process is possible within a fairly wide temperature range. In general, the work is carried out at room temperature or slightly to moderately elevated temperatures and preferably at about 20° to 60° C. It has proved expedient to stir the reaction mixture, after combining the starting components, for a longer period, e.g. about 1 to 12 hours, possibly with slight heating, in order to complete the reaction.

According to the Equation IV stated above, theoretically there are required equimolar amounts of the starting materials. The working-up of the mixture may take place in any customary manner. For, example, when the reaction has been carried out in a water-immiscible solvent, for instance a hydrocarbon or ether, the working-up may be effected by washing the solution, evaporating the solvent after separation of the layers and drying of the organic phase, and, if possible, subjecting the residue to fractional distillation.

The amidothionophosphoric acid phenyl esters according to the present invention are, in most cases, colorless to slightly colored, water-insoluble oils which in most cases cannot, even under greatly reduced pressure, be distilled without decomposition. Such products can, however, by so-called "slight distillation," that is brief heating to slightly to moderately elevated temperature, be freed from the last volatile constituents and in this way be purified.

As already mentioned above, the amidothioniphosphoric acid phenyl esters according to the invention possess an outstanding, rapidly-occurring and long-lasting insecticidal and acaricidal activity with, in some cases, extremely low phytotoxicity. The products may therefore be used with success in crop protection for the control of noxious sucking and biting insects, Diptera and mites. To the sucking insects contemplated herein there belong, in the main, aphids (Aphidae) such as the green peach aphid (*Myzus persicae*), the bean aphid (*Doralis fabae*), the bird cherry aphid (*Rhopalosiphum padi*), the pea aphid (*Macrosiphum pisi*) and the potato aphid (*Macrosiphum solanifolii*), the currant gall aphid (*Cryptomyzus korschelti*), the rosy apple aphid (*Sappaphis mali*), the mealy plum aphid (*Hyalopterus arundinis*) and the cherry black-fly (*Myzus cerasi*); in addition, scales and mealybugs (Coccina), for example the oleander scale (*Aspidiotus hederae*) and the soft scale (*Lecanium hesperidum*) as well as the grape mealybug (*Pseudococcus maritimus*); thrips (Thysanoptera), such as *Hercinothrips femoralis*, and bugs, for example the beet bug (*Piesma quadrata*), the red cotton bug (*Dysdercus intermedius*), the bed bug (*Cimex lectularius*), the assassin bug (*Rhodnius prolixus*) and Chagas' bug (*Triatoma infestans*) and, further, cicadas, such as *Euscelis bilobatus* and *Nephotettix bipunctatus*; and the like.

In the case of the biting insects contemplated herein, above all there should be mentioned butterfly caterpillars (Lepidoptera) such as the diamond-back moth (*Plutella maculipennis*), the gypsy moth (*Lymantria dispar*), the browntail moth (*Euproctis chrysorrhoea*) and tent caterpillar (*Malacosoma neustria*); further, the cabbage moth (*Mamestra brassicae*) and the cutworm (*Agrotis segetum*), the large white butterfly (*Pieris brassicae*), the small winter moth (*Cheimatobia brumata*), the green oak tortrix moth (*Tortrix viridana*), the fall armyworm (*Laphygma frugiperda*) and cotton worm (*Prodenia litura*), the ermine moth (*Hyponomeuta padella*), the Mediterranean flour moth (*Ephestia kühniella*) and greater wax moth (*Galleria mellonella*); and the like.

Also to be classed with the biting insects contemplated herein are bettles, (Coleoptera), for example the granary weevil (*Sitophilus granarius=Calandra granaria*), the Colorado bettle (*Leptinotarsa decemlineata*), the dock beetle (*Gastrophysa viridula*), the mustard bettle (*Phaedon cochleariae*), the blossom bettle (*Meligethes aeneus*), the raspberry bettle (*Byturus tomentosus*), the bean weevil (*Bruchidius=Acanthoscelides obtectus*), the leather bettle (*Dermestes frischi*), the khapra beetle (*Trogoderma granarium*), the flour beetle (*Tribolium castaneum*), the northern corn billbug (*Calandra or Sitophilus zeamais*) the drugstore bettle (*Stegobium paniceum*), the yellow mealworm (*Tenebrio molitor*) and the saw-toother grain bettle (*Oryzaephilus surinamensis*), and also species living in the soil, for example wiroworms (Agriotes spec.) and larvae of the cockchafer (*Melolontha melolontha*); cockroaches, such as the Germany cockroach (*Blattella germanica*), American cockroach (*Periplaneta americana*), Madeira cockroach (*Leucophaea or Rhyparobia maderae*), oriental cockroach (*Blatta orientalis*), the giant cockroach (*Blaberus giganteus*) and the black giant cockroach (*Blaberus fuscus*) as well as *Henschoutedenia flexivitta*; further, Orthoptera, for example the house cricket (*Acheta domesticus*); termites such as the eastern subterranean termite (*Reticulitermes flavipes*) and Hymenoptera such as ants, for example the garden ant (*Lasius niger*); and the like.

The Diptera contemplated herein comprise essentially the files, such as the vinegar fly (*Drosophila melanogaster*), the Mediterranean fruit fly (*Ceratitis capitata*), the house fly (*Musca domestica*), the little house fly (*Fannia canicularis*), the black blow fly (*Phormia regina*) and bluebottle fly (*Calliphora erythrocephala*) as well as the stable fly (*Stomoxys calcitrans*); further, gnats, for example mosquitoes such as the yellow fever mosquito (*Aedes aegypti*), the northern house mosquito (*Culex pipiens*) and the malaria mosquito (*Anopheles stephensi*); and the like.

With the mites (Acarina) contemplated herein there are classed, in particular, the spider mites (Tetranychidae) such as the two spotted spider mite (*Tetranychus telarius-Tetranychus althaeae* or *Tetranychus urticae*) and the European red mite (*Paratetranychus pilosus-Panonychus ulmi*), gall mites, for example the black currant gall mite (*Eriophyes ribis*) and tarsonemids) for example the broad mite (*Hemitarsonemus latus*) and the cyclmen mite (*Tarsonemus pallidus*); finally, ticks, such as the relapsing fever tick (*Ornithodorus moubata*); and the like.

When applied against pests harmful to health and pests of stored products, especially flies and mosquitoes, the compounds are also distinguished by an outstanding residual activity on wood and clay, as well as a good stability to alkali on limed substrates.

The active compounds according to the instant invention can be utilized, if desired, in the form of the usual formulations or compositions with conventional inert (i.e. plant compatible or herbicidally inert) pesticide diluents or extenders, i.e. diluents, carriers or extenders of the type usable in conventional pesticide formulations or compositions, e.g. conventional pesticide dispersible carrier vehicles such as gases, solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: aerosol propellants which are gaseous at normal temperatures and pressures, such as Freon; inert dispersible liquid diluent carriers, including inert organic solvents, such as aromatic hydrocarbons (e.g. benzene, toluene, xylene, etc.), halogenated, especially chlorinated, aromatic hydrocarbons (e.g. chlorobenzenes, etc.), paraffins (e.g. petroleum fractions), chlorinated aliphatic hydrocarbons (e.g. methylene chloride, etc.), alcohols (e.g. methanol, ethanol, propanol, butanol, etc.), amines (e.g. ethanolamine, etc.), ethers, ether-alcohols (e.g. glycol monomethyl ether, etc.), amides (e.g. dimethyl formamide, etc.), sulfoxides (e.g. dimethylsulfoxide, etc.), ketones (e.g. acetone, etc.), and/or water; as well as inert dispersible finely divided solid carriers, such as ground natural minerals (e.g. kaolins, clays, alumina, silica, chalk, i.e. calcium carbonate, talc, attapulgite, montomorillonite, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfonates, aryl sulfonates, etc., and especially alkyl arylpolyglyco ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other acaricides and insecticides, or fungicides, bactericides and nematocides, rodenticides, herbicides, fertilizers, growth-regulating agents, etc., if desired, or in the form of particular dosage preparations for specific application made therefrom, such as solutions, emulsions, suspensions, powders, pastes, and granules which are thus ready for use.

As concern commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.0005–20%, preferably 0.005–5%, by weight of the mixture. Thus, the present invention contemplates over-all compositions which comprise mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.0005–95%, and preferably 0.01–95%, by weight of the mixture.

The active compounds can also be used in accordance with the well known ultra-low-volume process with good success, i.e. by applying such compound if normally a liquid, or by applying a liquid composition containing the same, via very effective atomizing equipment, in finely divided form, e.g. average particle diameter of from 50–100 microns, or even less, i.e. mist form, for example by airplane crop spraying techniques. Only up to at most about a few liters/hectare are needed, and often amounts only up to about 15 to 1000 g./hectare, preferably 40 to 600 g./hectare, are sufficient. In this process it is possible to use highly concentrated liquid compositions with said liquid carrier vehicles containing from about 20 to about 95% by weight of the active compound or even the 100% active substance alone, e.g. about 20–100% by weight of the active compound.

Furthermore, the present invention contemplates methods of selectively killing, combating or controlling pests, e.g. insects and acarids, which comprises applying to at least one of correspondingly (a) such insects, (b) such acarids, and (c) the corresponding habitat thereof, i.e. the locus to be protected a correspondingly combative or toxic amount, i.e. an insecticidally or acaricidally effective amount, of the particular active compound of the invention alone or together with a carrier vehicle as noted above. The instant formulations or compositions are applied in the usual manner, for instance by spraying, atomizing, vaporizing, scattering, dusting, watering, squirting, sprinkling, pouring, fumigating, and the like.

It will be realized, of course, that the concentration of the particular active compound utilized in admixture with the carrier vehicle will depend upon the intended application. Therefore, in special cases it is possible to go above or below the aforementioned concentration ranges.

The unexpected superiority and outstanding activity of the particular new compounds of the present invention are illustrated, without limitation, by the following examples.

EXAMPLE 1

Phaedon larvae test

Solvent: 3 parts by weight acetone. Emulsifier: 1 part by weight alkylaryl polyglycol ether.

To produce a suitable preparation of active compound, 1 part by weight of the active compound is mixed with the stated amount of solvent containing the stated amount of emulsifier, and the concentrate is diuted with water to the desired concentration.

Cabbage leaves (*Brassica oleracea*) are sprayed with the preparation of the active compound until dripping wet and then infested with mustard beetle larvae (*Phaedon cochleariae*).

After the specified periods of time, the degree of destruction is determined as a percentage: 100% means that all the beetle larvae are killed. 0% means that none of the beetle larvae are killed.

The active compounds, the concentration of the active compound, the times of evaluation and the results can be seen from the following Table 1.

TABLE 1
(Phaedon larvae test)

| | Active compound (constitution) | Concentration of active compound in percent | Degree of destruction in percent after 3 days |
|---|---|---|---|
| (C) | 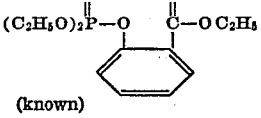 (known) | 0.1 | 0 |
| (A) | 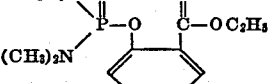 (known) | 0.1<br>0.01 | 100<br>0 |
| (B) | 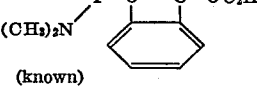 (known) | 0.1 | 0 |
| (1) | 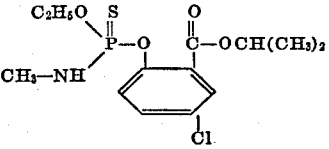 | 0.1<br>0.01<br>0.001 | 100<br>100<br>95 |
| (2) | 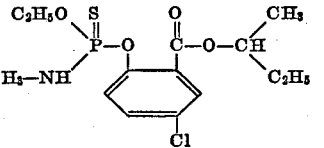 | 0.1<br>0.01 | 100<br>100 |
| (3) | 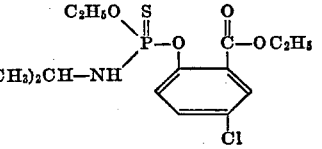 | 0.1<br>0.01<br>0.001 | 100<br>100<br>100 |
| (4) | 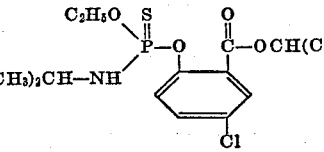 | 0.1<br>0.01<br>0.001<br>0.0001 | 100<br>100<br>100<br>100 |
| (5) | 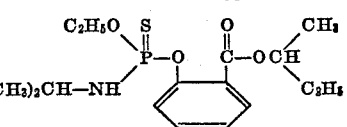 | 0.1<br>0.01<br>0.001 | 100<br>100<br>80 |
| (6) | 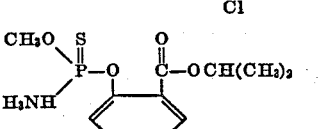 | 0.1<br>0.01<br>0.001 | 100<br>100<br>75 |
| (7) | 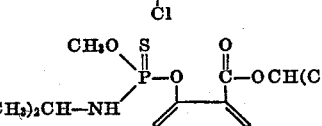 | 0.1<br>0.01<br>0.001<br>0.0001 | 100<br>100<br>100<br>90 |

EXAMPLE 2

Plutella test

Solvent: 3 parts by weight acetone
Emulsifier: 1 part by weight alkylaryl polyglycol ether.

To produce a suitable preparation of active compound, 1 part by weight of the active compound is mixed with the stated amount of solvent containing the stated amount of emulsifier and the concentrate is diluted with water to the desired concentration.

Cabbage leaves (*Brassica oleracea*) are sprayed with the preparation of the active compound until dew moist and are then infested with caterpillars of the diamond-back moth (*Plutella maculipennis*).

After the specified periods of time, the degree of destruction is determined as a percentage: 100% means that all the caterpillars are killed whereas 0% means that none of the caterpillars are killed.

The active compounds, the concentrations of the active compounds, the evaluation times and the results can be seen from Table 2.

TABLE 2
(Plutella test)

| | Active compound (constitution) | Concentration of active compound in percent | Degree of destruction in percent after 3 days |
|---|---|---|---|
| (C) | $(C_2H_5O)_2\overset{\overset{S}{\|}}{P}-O-\underset{}{\overset{\overset{O}{\|}}{C}}-OC_2H_5$ (phenyl ring attached) (known) | 0.1<br>0.01 | 80<br>0 |
| (A) | $\underset{(CH_3)_2N}{\overset{C_2H_5O}{\diagdown}}\overset{\overset{O}{\|}}{P}-O-\overset{\overset{O}{\|}}{C}-OC_2H_5$ (phenyl ring) (known) | 0.1<br>0.01 | 30<br>0 |
| (B) | $\underset{(CH_3)_2N}{\overset{(CH_3)_2N}{\diagdown}}\overset{\overset{O}{\|}}{P}-O-\overset{\overset{O}{\|}}{C}-OC_2H_5$ (phenyl ring) (known) | 0.1 | 0 |
| (8) | $\underset{CH_3-NH}{\overset{C_2H_5O}{\diagdown}}\overset{\overset{S}{\|}}{P}-O-\overset{\overset{O}{\|}}{C}-OC_2H_5$ (phenyl ring, Cl) | 0.1<br>0.01 | 100<br>40 |
| (1) | $\underset{CH_3-NH}{\overset{C_2H_5O}{\diagdown}}\overset{\overset{S}{\|}}{P}-O-\overset{\overset{O}{\|}}{C}-OCH(CH_3)_2$ (phenyl ring, Cl) | 0.1<br>0.01<br>0.001 | 100<br>100<br>55 |
| (2) | $\underset{CH_3-NH}{\overset{C_2H_5O}{\diagdown}}\overset{\overset{S}{\|}}{P}-O-\overset{\overset{O}{\|}}{C}-O\underset{C_2H_5}{\overset{CH_3}{\overset{\|}{C}H}}$ (phenyl ring, Cl) | 0.1<br>0.01 | 100<br>80 |
| (3) | $\underset{(CH_3)_2CH-NH}{\overset{C_2H_5O}{\diagdown}}\overset{\overset{S}{\|}}{P}-O-\overset{\overset{O}{\|}}{C}-OC_2H_5$ (phenyl ring, Cl) | 0.1<br>0.01<br>0.001 | 100<br>100<br>60 |
| (4) | $\underset{(CH_3)_2CH-NH}{\overset{C_2H_5O}{\diagdown}}\overset{\overset{S}{\|}}{P}-O-\overset{\overset{O}{\|}}{C}-OCH(CH_3)_2$ (phenyl ring, Cl) | 0.1<br>0.01<br>0.001 | 100<br>100<br>100 |
| (5) | $\underset{(CH_3)_2CH-NH}{\overset{C_2H_5O}{\diagdown}}\overset{\overset{S}{\|}}{P}-O-\overset{\overset{O}{\|}}{C}-O\underset{C_2H_5}{\overset{CH_3}{\overset{\|}{C}H}}$ (phenyl ring, Cl) | 0.1<br>0.01 | 100<br>90 |

TABLE 2—Continued

| Active compound (constitution) | Concentration of active compound in percent | Degree of destruction in percent after 3 days |
|---|---|---|
| (6) $\begin{array}{c}CH_3O\diagdown\phantom{xx}S\\\phantom{xxx}P-O\\CH_3-NH\diagup\end{array}\begin{array}{c}O\\\|\\C-OCH(CH_3)_2\end{array}$ (phenyl ring with Cl) | 0.1<br>0.01 | 100<br>100 |
| (7) $\begin{array}{c}CH_3O\diagdown\phantom{xx}S\\\phantom{xxx}P-O\\(CH_3)_2CH-NH\diagup\end{array}\begin{array}{c}O\\\|\\C-OCH(CH_3)_2\end{array}$ (phenyl ring with Cl) | 0.1<br>0.01<br>0.001 | 100<br>100<br>70 |

EXAMPLE 3

Myzus test (contact action)

Solvent: 3 parts by weight acetone
Emulsifier: 1 part by weight alkylarylpolyglycol ether.

To produce a suitable preparation of active compound, 1 part by weight of the active compound is mixed with the stated amount of solvent containing the stated amount of emulsifier and the concentrate is diluted with water to the desired concentration.

Cabbage plants (*Brassica oleracea*) which have been heavily infested with peach aphids (*Myzus persicae*) are sprayed with the preparation of the active compound until dripping wet.

After the specified periods of time, the degree of destruction is determined as a percentage: 100% means that all the aphids are killed whereas 0% means that none of the aphids are killed.

The active compounds, the concentrations of the active compounds, the evaluation times and the results can be seen from the following Table 3.

EXAMPLE 4

Tetranychus test

Solvent: 3 parts by weight acetone
Emulsifier: 1 part by weight alkylaryl polyglycol ether.

To produce a suitable preparation of active compound, 1 part by weight of the active compound is mixed with the stated amount of solvent containing the stated amount of emulsifier and the concentrate so obtained is diluted with water to the desired concentration.

Bean plants (*Phaseolus vulgaris*), which have a height of approximately 10–30 cm., are sprayed with the preparation of the active compound until dripping wet. These bean plants are heavily infested with spider mites (*Tetranychus urticae*) in all stages of development.

After the specified periods of time, the effectiveness of the preparation of active compound is determined by counting the dead mites. The degree of destruction thus obtained is expressed as a percentage: 100% means that all the spider mites are killed whereas 0% means that none of the spider mites are killed.

TABLE 3
(Myzus test)

| Active compound (constitution) | Concentration of active compound in percent | Degree of destruction in percent after 1 day |
|---|---|---|
| (C) $(C_2H_5O)_2\overset{S}{\underset{\|}{P}}-O-\overset{O}{\underset{\|}{C}}-OC_2H_5$ (phenyl) (known) | 0.1 | 0 |
| (A) $\begin{array}{c}C_2H_5O\diagdown\phantom{xx}O\\\phantom{xxx}P-O\\(CH_3)_2N\diagup\end{array}\begin{array}{c}O\\\|\\C-OC_2H_5\end{array}$ (phenyl) (known) | 0.1 | 0 |
| (B) $\begin{array}{c}(CH_3)_2N\diagdown\phantom{xx}O\\\phantom{xxx}P-O\\(CH_3)_2N\diagup\end{array}\begin{array}{c}O\\\|\\C-OC_2H_5\end{array}$ (phenyl) (known) | 0.1 | 0 |
| (4) $\begin{array}{c}C_2H_5O\diagdown\phantom{xx}S\\\phantom{xxx}P-O\\(CH_3)_2CH-NH\diagup\end{array}\begin{array}{c}O\\\|\\C-OCH(CH_3)_2\end{array}$ (phenyl ring with Cl) | .1<br>0.01 | 100<br>90 |
| (7) $\begin{array}{c}CH_3O\diagdown\phantom{xx}S\\\phantom{xxx}P-O\\(CH_3)_2CH-NH\diagup\end{array}\begin{array}{c}O\\\|\\C-OCH(CH_3)_2\end{array}$ (phenyl ring with Cl) | 0.1<br>0.01<br>0.001 | 100<br>100<br>100 |

The active compounds, the concentrations of the active compounds, the evaluation times and the results can be seen from the following Table 4.

compound is intimately mixed with soil. The concentration of the active compound in the preparation is of practically no importance; only the amount of active com-

TABLE 4
(Tetranychus test)

| Active compound (constitution) | Concentration of active compound in percent | Degree of destruction in percent after— | |
|---|---|---|---|
| | | 8 days | 2 days |
| (C) 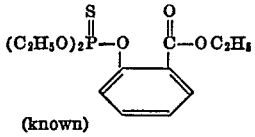 (known) | 0.1 | 0 | |
| (B) 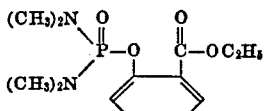 (known) | 0.1 | 0 | |
| (1) 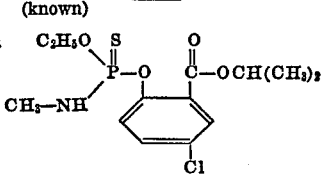 | 0.1 | 98 | |
| (2) 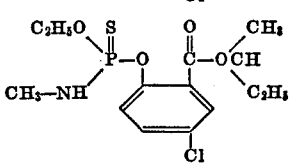 | 0.1 | 70 | |
| (3) 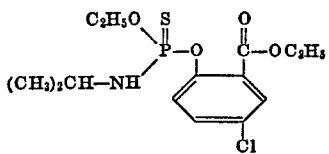 | 0.1<br>0.01 | 100<br>50 | |
| (4) 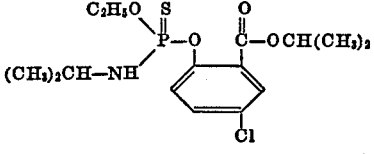 | 0.1 | 98 | |
| (9) 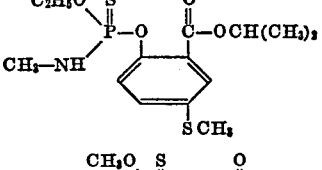 | 0.1 | | 90 |
| (7) 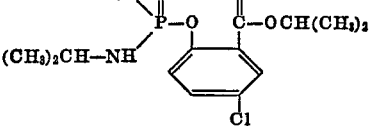 | 0.1 | | 100 |

EXAMPLE 5

Critical concentration test/soil insects

Test insect: cabbage root fly maggots (*Phorbia brassicae*)
Solvent: 3 parts by weight acetone
Emulsifier: 1 part by weight alkylarylpolyglycol ether.

To produce a suitable preparation of active compound, 1 part by weight of active compound is mixed with the stated amount of solvent, the stated amount of emulsifier is added and the concentrate is diluted with water to the desired concentration. The preparation of active compound is intimately mixed with soil. The concentration of the active compound in the preparation is of practically no importance; only the amount of active compound per unit volume of soil, which is given in p.p.m. (for example mg./l.), is decisive. The soil is filled into pots and the pots are left to stand at room temperature. After 24 hours, the test animals are put into the treated soil and, after a further 48 hours, the degree of effectiveness of the active compound is determined as a percentage by counting the dead and living test insects. The degree of destruction is 100% when all the test insects have been killed; it is 0% when exactly as many test insects are still alive as in the case of the control.

The active compounds, the amounts applied and the results can be seen from the following Table 5.

TABLE 5
*(Phorbia brassicae—maggots in the soil)*

| Active compound (constitution) | 20 | 10 | 5 | 2.5 | 1.25 |
|---|---|---|---|---|---|
| (3) $C_2H_5O$, $(CH_3)_2CH-NH$ — P(=S) — O — (4-Cl-phenyl) — C(=O) — O$C_2H_5$ | 100 | 100 | 100 | 95 | 90 |
| (4) $C_2H_5O$, $(CH_3)_2CH-NH$ — P(=S) — O — (4-Cl-phenyl) — C(=O) — OCH$(CH_3)_2$ | 100 | 100 | 100 | 90 | 20 |
| (1) $C_2H_5O$, $CH_3-NH$ — P(=S) — O — (4-Cl-phenyl) — C(=O) — OCH$(CH_3)_2$ | 100 | 100 | 100 | 75 | — |
| (5) $C_2H_5O$, $(CH_3)_2CH-NH$ — P(=S) — O — (4-Cl-phenyl) — C(=O) — OCH(CH$_3$)($C_2H_5$) | 100 | 100 | 70 | — | — |
| (2) $C_2H_5O$, $CH_3-NH$ — P(=S) — O — (4-Cl-phenyl) — C(=O) — OCH(CH$_3$)($C_2H_5$) | 100 | 100 | 70 | — | — |
| (10) (4-Cl-phenyl)—O—P(=S)(O$C_2H_5$)(NH$_2$); C(=O)—OCH(CH$_3$)$_2$ substituent | 100 | 100 | 50 | — | — |
| (C) $(C_2H_5O)_2$P(=S)—O—(phenyl)—C(=O)—O$C_2H_5$ (known) | 0 | | | | |
| (B) $(CH_3)_2N$, $(CH_3)_2N$ — P(=O) — O — (phenyl) — C(=O) — O$C_2H_5$ (known) | 0 | | | | |
| (A) $C_2H_5O$, $(CH_3)_2N$ — P(=O) — O — (phenyl) — C(=O) — O$C_2H_5$ (known) | — | — | — | — | — |

EXAMPLE 6

Critical concentration test/soil insects

Test insect: Agriotes sp.
Solvent: 3 parts by weight acetone
Emulsifier: 1 part by weight alkylarylpolyglycol ether.

To produce a suitable preparation of active compound, 1 part by weight of active compound is mixed with the stated amount of solvent, the stated amount of emulsifier is added and the concentrate is diluted with water to the desired concentration. The preparation of active compound is intimately mixed with soil. The concentration of the active compound in the preparation is of practically no importance; only the amount of active compound per unit volume of soil, which is given in p.p.m. (for example mg./l.), is decisive. The soil is filled into pots and the pots are left to stand at room temperature. After 24 hours, the test animals are put into the treated soil and, after a further 48 hours, the degree of effectiveness of the active compound is determined as a percentage by counting the dead and living test insects. The degree of destruction is 100% when all the test insects have been killed; it is 0% when exactly as many test insects are still alive as in the case of the control.

The active compounds, the amounts applied and the results can be seen from the following Table 6.

solved in 300 cc. of benzene. To this solution there are added at room temperature, with stirring, 30 g. of methylamine dissolved in 150 cc. of benzene. The mixture is subsequently stirred for 2 hours and washed twice, in each case with 100 cc. of water. The benzene solution is separated and the latter is dried over sodium sulfate. After the solvent has been distilled off, 108 g. (88% of theory) of N-methylamidothionophosphoric acid O-ethyl-O-(2-carbisopropoxy-4-chlorophenyl) ester are obtained in the form of a colorless, water-insoluble oil with a refractive index $n_D^{23}$ of 1.5360.

Calculated for a molecular weight of 351.5 (percent): P, 8.8; S, 9.1; N, 3.98; Cl, 10.1. Found (percent): P, 8.7; S, 9.0; N, 3.7; Cl, 10.3.

TABLE 6
(Agriotes sp. in the soil)

| Active compound (constitution) | Concentration of active compound in p.p.m. | | | | |
|---|---|---|---|---|---|
| | 20 | 10 | 5 | 2.5 | 1.25 |
| | Degree of destruction in percent | | | | |
| (3) [structure] | 100 | 100 | 100 | 95 | 30 |
| (4) [structure] | 100 | 100 | 95 | 50 | |
| (1) [structure] | 100 | 100 | 50 | | |
| (C) [structure] (known) | 0 | | | | |
| (B) [structure] (known) | 0 | | | | |
| (A) [structure] (known) | 0 | | | | |

The preparative process is illustrated in and by the following examples.

EXAMPLE 7

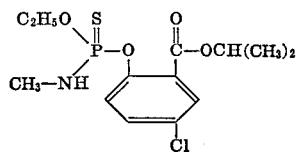
(1)

0.35 molar mixture.

125 g. of O-ethyl-O-(2-carbisopropoxy-4-chlorophenyl)-thionophosphoric acid diester-monochloride are dis-

EXAMPLE 8

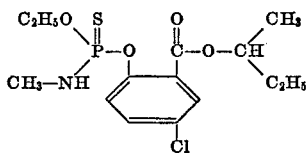
(2)

0.35 molar mixture.

To a solution of 130 g. of O-ethyl-O-(2-carb-sec.-butoxy - 4 - chlorophenyl)-thionophosphoric acid diester monochloride in 300 cc. of benzene there are added, with stirring, 30 g. of methylamine dissolved in 150 cc. of benzene. The mixture is stirred for a further 2 hours and then worked up as described in Example 1. There are obtained 111 g. (87% of theory) of N-methylamidothionophosphoric acid O-ethyl-O-(2-carb.-sec.-butoxy-4-chlorophenyl)-ester as a slightly yellow, water-insoluble oil with a refractive index $n_D^{23}$ of 1.5329.

Calculated for a molecular weight of 365.5 (percent): P, 8.5; S, 8.7; N, 3.8; Cl, 9.7. Found (percent): P, 8.2; S, 8.5; N, 3.7; Cl, 10.0.

EXAMPLE 9

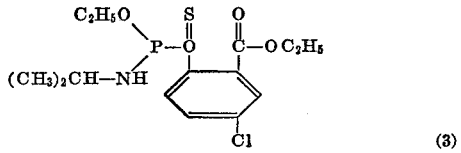

(3)

0.42 molar mixture.

152 g. of O-ethyl-O-(2-carbethoxy-4-chlorophenyl)-thionophosphoric acid diester monochloride are dissolved in 400 cc. of benzene. To this solution there are added at room temperature, with stirring, 51 g. of isopropylamine in 100 cc. of benzene. The mixture is afterwards stirred for 12 hours and then worked up as in Example 7. There are obtained 148 g. (97% of theory) of N-isopropylamidothionophosphoric acid O-ethyl-O-(2-carbethoxy-4-chlorophenyl)-ester in the form of a colorless, water-insoluble oil with a refractive index $n_D^{20}$ of 1.5327.

Calculated for a molecular weight of 365.5 (percent): P, 8.48; S, 8.77; N, 3.8; Cl, 9.73. Found (percent): P, 8.1; S, 8.5; N, 3.6; Cl, 10.0.

EXAMPLE 10

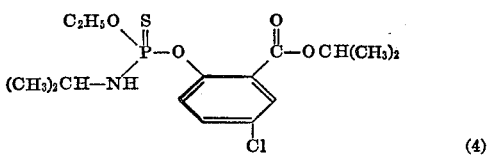

(4)

0.4 molar mixture.

143 g. of O-ethyl-O-(2-carbisopropoxy-4-chlorophenyl)-thionophosphoric acid diester monochloride are dissolved in 500 cc. of benzene; to this solution there are added at room temperature, with stirring, 53 g. of isopropylamine in 100 cc. of benzene; the mixture is subsequently stirred for 2 hours and then worked up as in Example 7. There are so obtained 128 g. (85% of theory) of N-isopropylamidothionophosphoric acid O-ethyl-O-(2-carbisopropoxy-4-chlorophenyl)-ester as a water-insoluble, colorless oil with a refractive index $n_D^{23}$ of 1.5262.

Calculated for a molecular weight of 375.5 (percent): P, 8.27; S, 8.5; N, 3.7; Cl, 9.46. Found (percent): P, 8.1; S, 8.3; N, 3.5; Cl, 9.9.

EXAMPLE 11

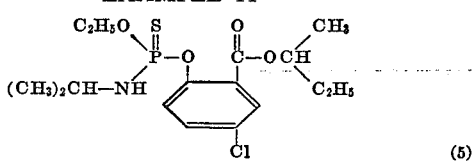

(5)

0.35 molar mixture.

To a solution of 130 g. of O-ethyl-O-(2-carb.-sec.-butoxy - 4 - chlorophenyl) - thionophosphoric acid diester monochloride in 300 cc. of benzene there are added 50 g. of isopropylamine in 50 cc. of benzene; the mixture is afterwards stirred for 2 hours at room temperature and then worked up as in Example 7. There are so obtained 119 g. (86% of theory) of N-isopropylamidothionophosphoric acid O-ethyl-O-(2-carb.-sec.-butoxy-4-chlorophenyl)-ester as a colorless, water-insoluble oil with a refractive index $n_D^{23}=1.5242$.

Calculated for a molecular weight of 393.5 (percent): P, 8.08; S, 8.1; N, 3.56; Cl, 9.03. Found (percent): P, 8.1; S, 7.9; N, 3.4; Cl, 9.4.

EXAMPLE 12

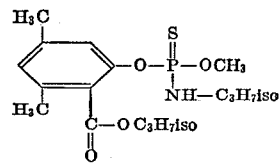

(11)

From 117 g. of O-methyl-O-(2-carbisopropoxy-3,5-dimethylphenyl)-thionophosphoric acid diester monochloride and 45 g. of isopropylamine there are obtained in a manner analogous to the foregoing examples 95 g. (76% of theory) of N-isopropylamidothionophosphoric acid O-methyl-O-(2-carbisopropoxy-3,5-dimethylphenyl) ester as a colorless, water-insoluble oil with a refractive index $n_D^{27}$ of 1.5180.

EXAMPLE 13

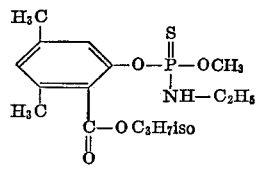

(12)

117 g. of O-methyl-O-(2-carbisopropoxy-3,5-dimethylphenyl)-thionophosphoric acid diester monochloride and 50 g. of a 50% strength aqueous ethylamine solution yield 91 g. (75% of theory) of N-ethylamidothionophosphoric acid - O - methyl-O-(2-carbisopropoxy-3,5-dimethylphenyl ester as a colorless, water-insoluble oil with a refractive index $n_D^{27}$ of 1.5217.

EXAMPLE 14

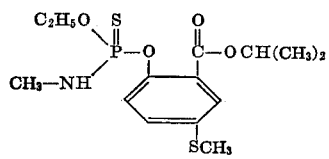

(9)

By reaction of 63 g. of O-ethyl-O-(2-carbisopropoxy-4 - methylmercaptophenyl)-thionophosphoric acid diester monochloride with 14 g. of methylamine dissolved in 100 cc. of benzene, there are obtained 50 g. (79% of theory) of N-methylamidothionophosphoric acid O-ethyl - O - (2-carbisopropoxy - 4 - methylmercaptophenyl)-ester as a colorless, water-insoluble oil with a refractive index $n_D^{26}$ of 1.5607.

EXAMPLE 15

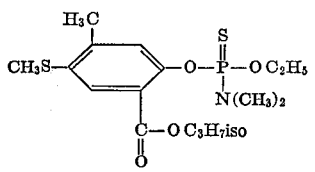

(13)

From 51 g. of O-ethyl-O-(2-carbisopropoxy-4-methylmercapto - 5 - methylphenyl)-thionophosphoric acid diester monochloride and 15 g. of dimethylamine dissolved in 100 cc. of benzene, there are obtained 46 g. (89% of theory) of N,N-dimethylamidothionophosphoric acid O-ethyl-O-(2-carbisopropoxy - 4 - methylmercapto-5-methylphenyl)-ester in the form of a colorless, water-insoluble oil with a refractive index $n_D^{24}$ of 1.5490.

EXAMPLE 16

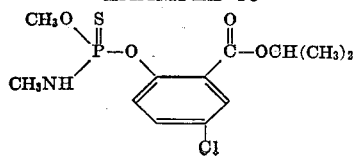

(6)

By reaction of 105 g. of O-methyl-O-(2-carbisopropoxy-4-chlorophenyl)-thionophosphoric acid diester monochloride with 20 g. of methylamine dissolved in 100 cc. of benzene, there are obtained 35 g. of N-methylamidothionophosphoric acid O-methyl-O-(2 - carbisopropoxy-4-chlorophenyl) ester as a colorless, water-insoluble oil with a refractive index $n_D^{25}$ of 1.5449.

EXAMPLE 17

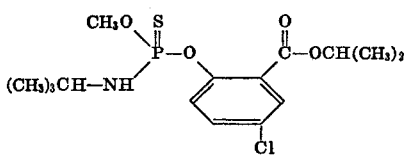

(7)

105 g. of O-methyl-O-(2-carbisopropoxy-4-chlorophenyl)-thionophosphoric acid diester monochloride and 38 g. of isopropylamine yield 77 g. (76% of theory) of N-isopropylamidothionophosphoric acid O-methyl-O-(2-carbisopropoxy - 4 - chlorophenyl)-ester as a colorless, water-insoluble oil with a refractive index $n_D^{24}$ of 1.5330.

EXAMPLE 18

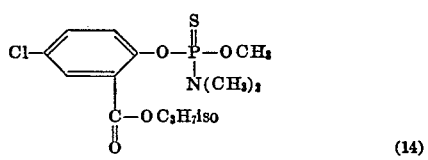

(14)

From 105 g. of O-methyl-O-(2-carbisopropoxy-4-chlorophenyl)-thionophosphoric acid diester monochloride and 30 g. of dimethylamine dissolved in 100 cc. of benzene, there are obtained 75 g. (71% of theory) of N,N-dimethylamidothionophosphoric acid O-methyl - O - (2-carbisopropoxy-4-chlorophenyl)-ester with a refractive index $n_D^{24}$ of 1.5380.

It will be appreciated that the instant specification and examples are set forth by way of illustration and not limitation, and that various modifications and changes may be made without departing from the spirit and scope of the present invention.

What is claimed is:

1. Amidothionophosphoric acid phenyl esters of the general formula

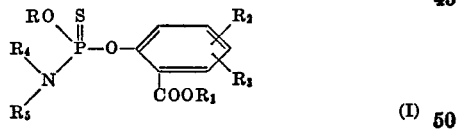

(I)

in which

R and $R_1$ each is a lower alkyl radical.

$R_2$ is a halogen, lower alkyl or lower alkylmercapto radical, $R_3$ and $R_5$ each is hydrogen or a lower alkyl radical, $R_2$ and $R_3$ when other than hydrogen, being located in the 3-, 4- or 5-position, and $R_4$ is a lower alkyl radical.

2. Compounds according to claim 1, in which R is an alkyl radical with 1–3 carbon atoms; $R_1$ is an alkyl radical with 2–4 carbon atoms, $R_2$ is a chlorine atom or a methyl or methylmercapto radical; $R_3$ is a hydrogen atom or a methyl radical; $R_4$ is an alkyl radical with 1–3 carbon atoms; and $R_5$ is a hydrogen atom.

3. Compound according to claim 1 wherein such compound is N-methylamidothionophosphoric acid O-ethyl-O-(2-carbisopropoxy-4-chlorophenyl)-ester of the formula

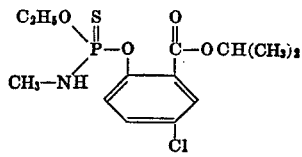

(1)

4. Compound according to claim 1 wherein such compound is N-methylamidothionophosphoric acid O-ethyl-O-(2-carb.-sec.-butoxyphenyl)-ester of the formula

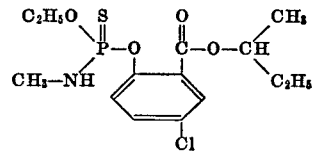

(2)

5. Compound according to claim 1 wherein such compound is N-isopropylamidothionophosphoric acid O-ethyl-O-(2-carbethoxy-4-chlorophenyl)-ester of the formula

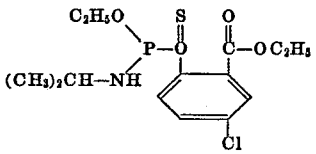

(3)

6. Compound according to claim 1 wherein such compound is N-isopropylamidothionophosphoric acid O-ethyl-O-(2-carbisopropoxy-4-chlorophenyl)-ester of the formula

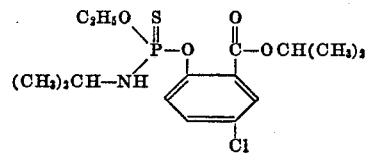

(4)

7. Compound according to claim 1 wherein such compound is N-isopropylamidothionophosphoric acid O-methyl-O-(2-carbisopropoxy-4-chlorophenyl)-ester of the formula

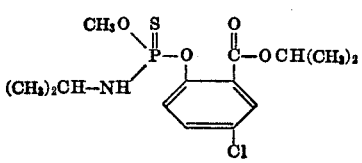

(7)

References Cited

UNITED STATES PATENTS 3,621,082 11/1971 Schrader et al. _____ 260—941
3,351,682 11/1967 Baker et al. _____ 260—941 X ANTON H. SUTTO, Primary Examiner U.S. Cl. X.R.

424—212

CERTIFICATE OF CORRECTION

Patent No. 3,808,298  Dated April 30, 1974

Inventor(s) GERHARD SCHRADER ET AL

It is certified that error appears in the above-identified patent and that said Letters Patent are hereby corrected as shown below:

Col. 4, line 57, change "files" to -- flies --.

Col. 5, line 53, change "arylpolyglyco" to -- arylpolyglycol --.

Col. 9, 10, Table 2, compound (4), correct formula to read as follows:

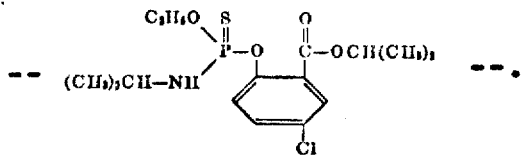

Col. 15, Table 5, compound (A), before " .........." insert -- 0 --.

Signed and sealed this 22nd day of October 1974.

(SEAL)
Attest:

McCOY M. GIBSON JR.
Attesting Officer

C. MARSHALL DANN
Commissioner of Patents